United States Patent Office 2,972,667
Patented Feb. 21, 1961

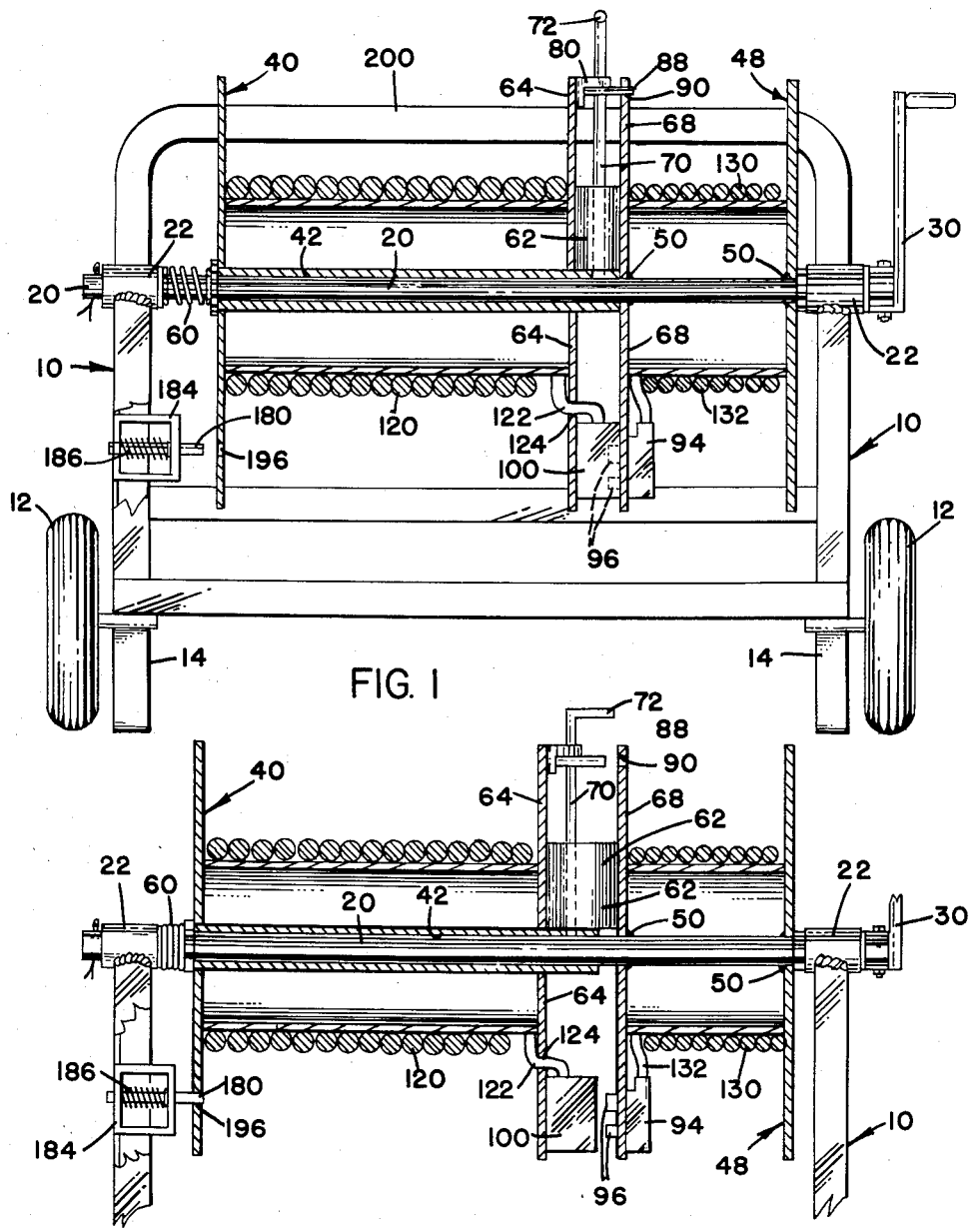

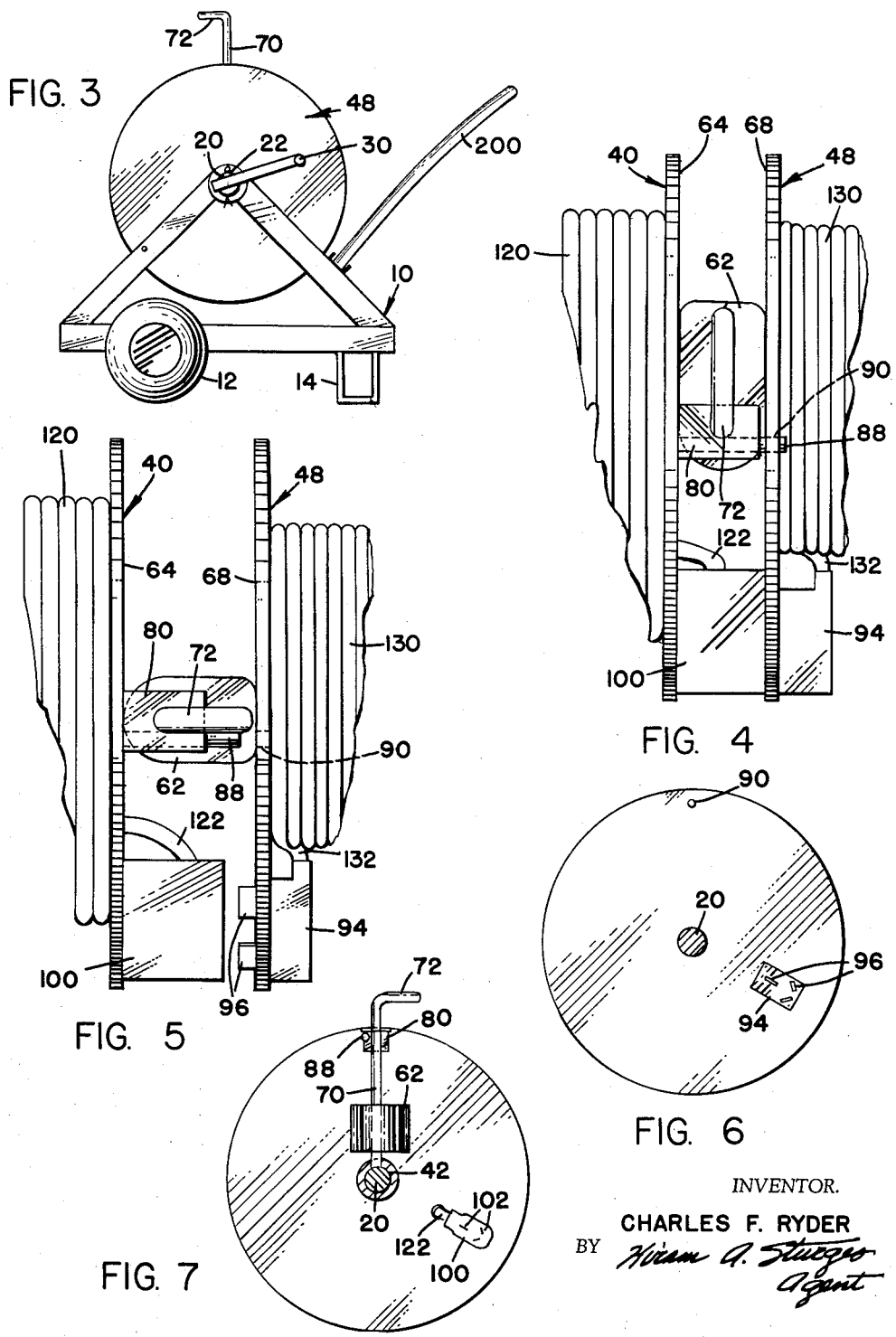

2,972,667

PORTABLE CABLE REEL

Charles F. Ryder, Gordon, Nebr.

Filed May 4, 1959, Ser. No. 810,713

6 Claims. (Cl. 200—153)

This invention relates to an electrical reel device and more particularly it is an object of this invention to provide an electrical reel which is adapted to receive an electrical cord or cable on each of two reels disposed alongside each other and electrically connectible and disconnectible from each other, whereby the cable on one reel can be unwound to extend in one direction and the cable on the other reel in another direction with the interconnection being done in an economical, dependable and simple manner.

A further object is to provide a reel device having a pair of reels as described in which the electrical interconnection is done by means of male and female fittings of common, dependable and conventional construction as is made possible by my new concept of mechanism for holding the two reels apart to mount the electrical connections in disengagement during unreeling and yet permitting their later engagement for electrical service.

Other and further objects and advantages of the present invention will be apparent from the following detailed description, drawings and claims, the scope of the invention not being limited to the drawings themselves as the drawings are only for the purpose of illustrating a way in which the principles of this invention can be applied.

Other embodiments of the invention utilizing the same or equivalent principles may be used and structural changes may be made as desired by those skilled in the art without departing from the present invention and the purview of the appended claims.

In the drawings:

Fig. 1 is a frontal elevation of the electrical reel of this invention with parts removed and other parts shown in section for convenience of illustration;

Fig. 2 is a view of the upper part of the reel in detail, the parts being as seen in Fig. 1 but with the reels in a greater portion of spacing in which their electrical cables or cords are electrically discharged;

Figure 3 is an end elevation of the reel;

Fig. 4 is a top plan detail showing the reels in a lesser reel spacing position;

Fig. 5 is a top plan detail showing the reels in a closer reel spacing position;

Fig. 6 is an end view of the inner side of one of the reels of Fig. 1; and

Fig. 7 is a detail showing an end view of the inner side of the other reel of Fig. 1.

The electrical cable reel of this invention comprises a frame generally indicated at 10, the frame is preferably supported by wheels 12 at the forward end and one or more legs 14 at the rearward end.

A shaft 20 is horizontally mounted on the frame held in by bearings 22.

Means are provided for rotating the shaft and this means can be a crank handle 30 suitably attached to the shaft.

A first reel 40 is mounted on the shaft 20 in a manner for rotating with respect to the shaft 20, the reel 40 having a horizontal opening 42 through the center thereof rotatably receiving the shaft 20, as best seen in Fig. 1.

A second reel 48 is also mounted on the shaft 20 alongside the first reel 40, the second reel 48 being fixed to the shaft as at 50 by means of welding or other suitable means.

A coiled spring 60 disposed on the shaft 20 between the reel 40 and the adjacent bearing 22 urges the first reel 40 constantly toward the second reel 48.

A cam 62 disposed between the first and second reels 40 and 48 is adapted to engage the opposed walls 64 and 68 of the reels respectively. A shaft 70 extends upwardly from the cam 62 and is adapted to be rotated by a handle 72 on the upper end of the shaft whereby the cam 62 assumes at times a first position, best seen in Fig. 5, for holding the reels apart a greater distance; and also for rotating the cam 62 into a second position, best seen in Fig. 4, for holding the reels apart a lesser distance than they are held apart in the first cam position of Fig. 5. Figures 1 and 4 correspond with one another, both representing the cam in the second position.

The shaft 70 for rotating the cam is mounted on one of the reels, preferably the first reel 40, in a way permitting the cam 62 to be moved between the said first and second positions. This mounting means preferably comprises having the shaft 70 rotatably held in a fitting 80 which is attached to the adjacent end wall 64 of the first reel 40.

One of the reels, preferably the first reel 40, has a projection 88 extending outwardly therefrom and toward the other reel 48, the other reel 48 having a recess or opening 90 therein, and preferably extending through its end wall 68 for receiving the projection 88 at times when the recess or opening 90 is disposed in registry with the projection 88.

A male fitting 94 is mounted on the second reel 48 but being suitably fixed to its end wall 68. The male fitting 94 preferably is mostly disposed on the inner side of the end wall 68 but has prongs 96 projecting outwardly from the end wall 68 toward the end wall 64 of the first reel 40.

A female fitting 100 is fixed preferably on the outer side of the wall 64 of the first reel 40 and has recesses therein, best seen at 102, in Fig. 7 which receive the male prongs 96.

The positions of the male and female fittings 94 and 100 are correlated with the positions of the projection 88 and recess or opening 90 such that the male and female fittings 94 and 100 are positioned so as to be in registry only at times when the projection 88 is received in the recess or opening 90.

A coil of wire 120 is disposed about the reel 40 with its end 122 extending through an opening 124 in the wall 64 whereby the end 122 enters the female fitting 100.

As thus described it will be seen that when the cam member 62 is in the position for greater reel spacing, as shown in Figures 2 and 5, the male and female fittings 94 and 100 will be disconnected and the projection 88 and its recess or opening 90 will be disengaged.

And when the cam member 60 is in position for lesser space, shown in Figures 1 and 4, the projection 88 will press against the sidewall 68 of the second reel 48 until such time as the prong 88 comes in registry with the recess or opening 90, which it will then enter at the same time permitting the engagement of the male and female fittings 94 and 100. But at this time until the projection 88 registers with its recess or opening 90 it will ride on the outside of the sidewall 68 and is of such a projecting length as to hold the prongs 96 of the male fitting 94 away from the female fitting 100.

As best seen in Fig. 1 a stop pin 180 is movably mounted on the frame on that side of the first reel 40 which is opposite the second reel 48. More specifically the stop pin 180 is preferably slidably received in a mounting 184 which later is fixed to the frame.

A spring 186 is fixed to the pin 180 at its inner end and bears against the mounting 184 at its outer end for urging the stop pin 180 constantly toward the first reel 40.

And the first reel 40 has a stop pin receiving means or opening 196 therein and in the adjacent side thereof for receiving the stop pin to prevent rotation of the first reel at times when the cam 60 is in a position of greater reel spacing, best seen in Fig. 2, so that at these times the stop pin 180 will bear against and ride on the adjacent outer side of the reel 40 until it falls into the opening 196 and thereby prevents rotation of the first reel 40.

A handle 200 is provided for ease of portability which is secured to and extends from the rear of the frame 10.

As thus described, it will be seen that this invention fulfills the objectives hereinabove set forth providing a new type of reel having special uses for which it is better fitted than any reel heretofore devised.

From the foregoing description, it is thought to be obvious that a portable cable reel constructed in accordance with my invention is particularly well adapted for use, by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

I claim:

1. An electrical cable reel comprising a frame, and a shaft rotatably mounted on said frame, means for rotating said shaft, a first reel mounted on said shaft in a manner rotatably with respect thereto, said first reel being slidable endwise of said shaft in either direction, a second reel also mounted on said shaft alongside said first reel, said second reel being fixed to said shaft for rotation therewith, means constantly urging said first reel toward said second reel, a cam disposed between said first reel and said second reel and adapted to engage the opposed walls of both of said reels, means movably mounting said cam member on one of said reels in a way permitting said cam member to be moved between a first position for holding said reels apart a greater distance and a second position for holding said reels apart a lesser distance, means for rotating said cam member between said first and second positions, one of said reels having a projection extending outwardly therefrom and extending toward the other reel, the other reel having a recess therein for receiving said projection at times when said recess is disposed in registry with said projection, male and female electrical fittings mounted respectively on said reels adjacent the opposing ends thereof, said male and female fittings being positioned so as to be in fitting registry only at times when said projection is in registry with said means for receiving said projection whereby coils of wires can be attached to said electrical fittings for reception on said reels respectively, the construction being such that when said cam member is in said second position of lesser reel spacing, said projection will register with said projection receiving means and said male and female fittings will be interconnected and also such that when said cam member is in the first position for greater reel spacing said projection will be out of said projection receiving means and said male and female fittings will be separated whereby said reels are freely rotatable independently of each other.

2. The construction of claim 1 in which there is further provided a stop pin movably mounted on said frame and projecting toward that side of said first reel which is disposed farthest from said second reel, means for consistently urging said lock pin inwardly toward said first reel, and said first reel having a stop pin receiving means cooperating with said stop pin to prevent rotation of said first reel.

3. The construction of claim 1 in which said male fitting has male prongs and in which said projection projects toward said second reel a certain distance beyond the spacing provided by said cam member while the latter is in said second position of lesser reel spacing, said certain distance being greater than the distance the male prongs project beyond the male fitting.

4. An electrical cable reel comprising a frame, and a shaft rotatably mounted on said frame, means for rotating said shaft, a first reel mounted on said shaft in a manner rotatably with respect thereto, said first reel being slidable endwise of said shaft in either direction, a second reel also mounted on said shaft alongside said first reel, said second reel being fixed to said shaft for rotation therewith, means for releasably securing said reels together for simultaneous rotation, an electrical socket and plug mounted on respective ones of said release in positions adapted to be disposed opposite each other for interfitting at times when said first reel is moved sufficiently towards said second reel.

5. A combination of claim 4 in further combination with releasable means connectable to said frame and to said first reel to prevent rotation of said first reel when desired.

6. An electrical cable reel comprising a frame, and a shaft rotatably mounted on said frame, means for rotating said shaft, a first reel mounted on said shaft in a manner rotatably with respect thereto, said first reel being slidable endwise of said shaft in either direction, a second reel also mounted on said shaft alongside said first reel, said second reel being fixed to said shaft for rotation therewith, means for releasably securing said reels together for simultaneous rotation, an electrical socket and plug mounted on respective ones of said release in positions adapted to be disposed opposite each other for interfitting at times when said first reel is moved sufficiently towards said second reel, means for releasably interconnecting said two reels so that they rotate sufficiently in unison so that when said plug and socket are interconnected, there is no strain on the prongs of said plug.

References Cited in the file of this patent

UNITED STATES PATENTS

| 1,665,737 | Gough | Apr. 10, 1928 |
| 2,453,407 | Burns | Nov. 9, 1948 |
| 2,585,070 | Allard | Feb. 12, 1952 |